United States Patent
Karst

(10) Patent No.: US 8,956,490 B1
(45) Date of Patent: Feb. 17, 2015

(54) IDENTIFICATION CARD SUBSTRATE SURFACE PROTECTION USING A LAMINATED COATING

(75) Inventor: Karl A. Karst, Woodbury, MN (US)

(73) Assignee: Assa Abloy AB, Stockholm (SE)

( * ) Notice: Subject to any disclaimer, the term of this patent is extended or adjusted under 35 U.S.C. 154(b) by 745 days.

(21) Appl. No.: 12/136,892

(22) Filed: Jun. 11, 2008

Related U.S. Application Data

(60) Provisional application No. 60/937,052, filed on Jun. 25, 2007.

(51) Int. Cl.
*B29C 65/00* (2006.01)
*B44C 1/165* (2006.01)
*B44C 1/17* (2006.01)

(52) U.S. Cl.
USPC ........... 156/247; 156/250; 156/251; 156/267; 156/230; 156/234; 428/32.11

(58) Field of Classification Search
USPC .................. 156/250, 247, 237, 234, 230, 251
See application file for complete search history.

(56) References Cited

U.S. PATENT DOCUMENTS

| | | | |
|---|---|---|---|
| 3,193,430 A | 7/1965 | Messmer et al. | 156/521 X |
| 3,434,902 A | 3/1969 | Bliss | 456/230 |
| 3,713,939 A | 1/1973 | Preg | 156/248 |
| 3,857,527 A | 12/1974 | Kranz | 242/75.5 |
| 3,879,246 A | 4/1975 | Walker | 156/265 |
| 3,922,435 A | 11/1975 | Asnes | 428/349 |
| 4,006,050 A | 2/1977 | Hurst et al. | 101/369 |
| 4,032,135 A | 6/1977 | Ruenzi | 271/116 |
| 4,224,358 A | 9/1980 | Hare | 427/147 |
| 4,235,657 A | 11/1980 | Greenman et al. | 156/234 |
| 4,300,974 A | 11/1981 | Bauer | 156/360 |
| 4,399,209 A | 8/1983 | Sanders et al. | 430/138 |
| 4,457,964 A | 7/1984 | Kaminstein | 428/43 |
| 4,474,850 A | 10/1984 | Burwasser | 428/336 |
| 4,528,242 A | 7/1985 | Burwasser | 428/413 |

(Continued)

FOREIGN PATENT DOCUMENTS

| | | |
|---|---|---|
| EP | 0 278 517 A2 | 2/1988 |
| EP | 0 442 762 | 8/1991 |

(Continued)

OTHER PUBLICATIONS

U.S. Appl. No. 60/493,129, filed Aug. 7, 2003.

(Continued)

*Primary Examiner* — Alex Efta
(74) *Attorney, Agent, or Firm* — Westman, Champlin & Koehler, P.A.

(57) ABSTRACT

In a method of forming an identification card, a card substrate having a surface is provided. A film laminate comprising a backing layer and one or more dried transferable layers attached to the backing layer is provided. One of the transferable layers comprises a coating comprising an inorganic ceramic-like material and a water insoluble polymer binder. The film laminate is laminated to the surface of the card substrate such that an exposed surface of the one or more transferable layers adheres to the surface of the card substrate. The backing layer is then removed from at least a portion of the one or more transferable layers that remain adhered to the surface of the card substrate. Additional embodiments are generally directed to a method of protecting a surface of an identification card and identification card manufacturing devices for performing the methods.

19 Claims, 5 Drawing Sheets

(56) References Cited

U.S. PATENT DOCUMENTS

| | | | | |
|---|---|---|---|---|
| 4,548,857 A | 10/1985 | Galante | | 428/200 |
| 4,555,437 A | 11/1985 | Tanck | | 428/212 |
| 4,568,403 A | 2/1986 | Egan | | 156/247 |
| 4,575,465 A | 3/1986 | Viola | | 427/261 |
| 4,578,285 A | 3/1986 | Viola | | 427/209 |
| 4,592,954 A | 6/1986 | Malhotra | | 428/335 |
| 4,617,080 A | 10/1986 | Kobayashi et al. | | 156/359 |
| 4,650,714 A | 3/1987 | Kojima et al. | | 428/341 |
| 4,680,235 A | 7/1987 | Murakami et al. | | 428/414.4 |
| 4,732,786 A | 3/1988 | Patterson et al. | | 427/261 |
| 4,758,461 A | 7/1988 | Akiya et al. | | 428/212 |
| 4,758,952 A | 7/1988 | Harris, Jr. et al. | | 364/300 |
| 4,770,934 A | 9/1988 | Yamasaki et al. | | 428/331 |
| 4,830,911 A | 5/1989 | Kojima et al. | | 428/342 |
| 4,839,200 A | 6/1989 | Hoffman et al. | | 427/265 |
| 4,868,581 A | 9/1989 | Mouri et al. | | 346/1.1 |
| 4,877,678 A | 10/1989 | Hasegawa et al. | | 428/216 |
| 4,877,686 A | 10/1989 | Riou et al. | | 428/514 |
| 4,877,688 A | 10/1989 | Senoo et al. | | 428/522 |
| 4,897,533 A | 1/1990 | Lyszczarz | | 235/487 |
| 4,900,620 A | 2/1990 | Tokita et al. | | 428/330 |
| 4,910,084 A | 3/1990 | Yamasaki et al. | | 428/411.1 |
| 4,923,848 A | 5/1990 | Akada et al. | | |
| 4,926,190 A | 5/1990 | Laver | | 346/411.1 |
| 4,938,830 A | 7/1990 | Cannistra | | 156/270 |
| 4,944,988 A | 7/1990 | Yasuda et al. | | 428/195 |
| 4,966,815 A | 10/1990 | Hare | | 428/497 |
| 4,980,224 A | 12/1990 | Hare | | 428/202 |
| 5,006,407 A | 4/1991 | Malhotra | | 428/336 |
| 5,019,475 A | 5/1991 | Higashiyama et al. | | 430/138 |
| 5,028,028 A | 7/1991 | Yamada et al. | | 248/430 |
| 5,041,328 A | 8/1991 | Akiya et al. | | 428/212 |
| 5,073,448 A | 12/1991 | Vieira et al. | | 428/331 |
| 5,079,901 A | 1/1992 | Kotsiopoulos | | 225/4 X |
| 5,084,340 A | 1/1992 | Light | | 428/327 |
| 5,096,781 A | 3/1992 | Vieira et al. | | 428/411.1 |
| 5,101,218 A | 3/1992 | Sakaki et al. | | 346/1.1 |
| 5,110,389 A | 5/1992 | Hiyoshi et al. | | 156/234 |
| 5,118,570 A | 6/1992 | Malhotra | | 428/474.4 |
| 5,120,601 A | 6/1992 | Kotaki et al. | | 428/327 |
| 5,124,201 A | 6/1992 | Kurabayashi et al. | | 428/323 |
| 5,126,193 A | 6/1992 | Light | | 428/327 |
| 5,126,194 A | 6/1992 | Light | | 428/327 |
| 5,137,778 A | 8/1992 | Nakatsugawa et al. | | 428/330 |
| 5,139,867 A | 8/1992 | Light | | 428/327 |
| 5,139,868 A | 8/1992 | Mori et al. | | 428/327 |
| 5,139,917 A | 8/1992 | Hare | | 430/138 |
| 5,141,797 A | 8/1992 | Wheeler | | 428/195 |
| 5,165,973 A | 11/1992 | Kojima et al. | | 428/331 |
| 5,171,626 A | 12/1992 | Nagamine et al. | | 428/212 |
| 5,180,624 A | 1/1993 | Kojima et al. | | 428/211 |
| 5,185,213 A | 2/1993 | Fujita et al. | | 428/500 |
| 5,190,234 A | 3/1993 | Ezekiel | | 156/502 |
| 5,190,805 A | 3/1993 | Atherton et al. | | 428/195 |
| 5,194,317 A | 3/1993 | Sato et al. | | 428/195 |
| 5,206,071 A | 4/1993 | Atherton et al. | | 428/195 |
| 5,208,092 A | 5/1993 | Iqbal | | 428/195 |
| 5,213,873 A | 5/1993 | Yasuda et al. | | 428/195 |
| 5,236,801 A | 8/1993 | Hare | | 430/199 |
| 5,238,524 A | 8/1993 | Seki et al. | | 156/538 |
| 5,241,328 A | 8/1993 | Sarraf et al. | | 347/232 |
| 5,246,774 A | 9/1993 | Sakaki et al. | | 428/323 |
| 5,252,531 A | 10/1993 | Yasuda et al. | | 503/227 |
| 5,266,383 A | 11/1993 | Sakaki et al. | | 428/195 |
| 5,271,990 A | 12/1993 | Kronzer et al. | | 428/195 |
| 5,277,501 A | 1/1994 | Tanaka et al. | | 400/120 |
| 5,277,734 A | 1/1994 | Bayer | | 156/230 |
| 5,277,962 A | 1/1994 | Nakatsugawa et al. | | 428/206 |
| 5,281,467 A | 1/1994 | Shimada et al. | | 428/195 |
| 5,290,067 A | 3/1994 | Langen | | 283/60.1 |
| 5,302,436 A | 4/1994 | Miller | | 428/195 |
| 5,302,437 A | 4/1994 | Idei et al. | | 428/195 |
| 5,320,897 A | 6/1994 | Kondo et al. | | 428/195 |
| 5,328,748 A | 7/1994 | Westfal | | 428/195 |
| 5,334,439 A | 8/1994 | Kawaguchi et al. | | 428/212 |
| 5,338,597 A | 8/1994 | Kurabayashi et al. | | 428/195 |
| 5,352,503 A | 10/1994 | Drake et al. | | 428/195 |
| 5,362,558 A | 11/1994 | Sakaki et al. | | 428/323 |
| 5,362,703 A | 11/1994 | Kawasaki et al. | | 503/227 |
| 5,364,702 A | 11/1994 | Idei et al. | | 428/423.1 |
| 5,372,884 A | 12/1994 | Abe et al. | | 428/331 |
| 5,407,724 A | 4/1995 | Mimura et al. | | 428/141 |
| 5,431,501 A | 7/1995 | Hale et al. | | 400/120.02 |
| 5,432,145 A | 7/1995 | Oshima et al. | | |
| 5,437,960 A | 8/1995 | Nagate et al. | | 430/256 |
| 5,447,566 A | 9/1995 | Loiacond | | 101/228 |
| 5,451,560 A | 9/1995 | Akada et al. | | |
| 5,484,215 A | 1/1996 | Fillod et al. | | 400/120.18 |
| 5,484,502 A | 1/1996 | Bozanic | | 156/235 |
| 5,503,702 A | 4/1996 | Filicicchia et al. | | 156/249 |
| 5,532,724 A | 7/1996 | Inagaki et al. | | 347/213 |
| 5,549,774 A | 8/1996 | Miekka et al. | | 156/209 |
| 5,573,621 A | 11/1996 | Boreali | | 156/256 |
| 5,589,434 A | 12/1996 | Takahara et al. | | |
| 5,614,058 A | 3/1997 | Didelot et al. | | 156/542 |
| 5,623,001 A | 4/1997 | Figov | | 522/84 |
| 5,626,699 A | 5/1997 | Didelot et al. | | 156/99 |
| 5,629,259 A | 5/1997 | Akada et al. | | |
| 5,637,174 A | 6/1997 | Field et al. | | 156/256 |
| 5,647,938 A | 7/1997 | Levine | | 156/269 |
| 5,673,076 A | 9/1997 | Nardone et al. | | 347/171 |
| 5,697,297 A | 12/1997 | Rasmussen | | 101/211 |
| 5,700,537 A | 12/1997 | Instance | | 156/253 |
| 5,706,042 A | 1/1998 | Takeyama et al. | | 347/100 |
| 5,707,925 A | 1/1998 | Akada et al. | | 503/227 |
| 5,729,817 A | 3/1998 | Raymond et al. | | 400/635 |
| 5,735,994 A | 4/1998 | Lappe et al. | | 156/386 |
| 5,765,481 A | 6/1998 | Tortora et al. | | 101/211 |
| 5,769,408 A | 6/1998 | Selak et al. | | 271/10.03 |
| 5,770,268 A | 6/1998 | Kuo et al. | | 427/386 |
| 5,773,188 A | 6/1998 | Ellis | | 430/201 |
| 5,783,024 A | 7/1998 | Forkert | | 156/351 |
| 5,785,224 A | 7/1998 | Nowakowski | | 225/4 |
| 5,790,924 A | 8/1998 | Creutzmann et al. | | 399/110 |
| 5,798,161 A | 8/1998 | Kita et al. | | 428/64.1 |
| 5,807,461 A | 9/1998 | Hagstrom | | 156/361 |
| 5,814,796 A | 9/1998 | Benson et al. | | 235/375 |
| 5,820,277 A | 10/1998 | Schulte | | 400/223 |
| 5,825,392 A | 10/1998 | Mochizuki | | 347/197 |
| 5,850,248 A | 12/1998 | Bellemore | | 347/262 |
| 5,861,355 A | 1/1999 | Olson et al. | | 503/201 |
| 5,873,606 A | 2/1999 | Haas et al. | | 283/75 |
| 5,874,145 A | 2/1999 | Waller | | 428/42.1 |
| 5,885,927 A | 3/1999 | Takahara et al. | | |
| 5,940,111 A | 8/1999 | Akada et al. | | |
| 5,941,522 A | 8/1999 | Hagstrom et al. | | 271/225 |
| 5,942,335 A | 8/1999 | Chen et al. | | 428/500 |
| 5,980,011 A | 11/1999 | Cummins et al. | | 347/4 |
| 5,981,045 A | 11/1999 | Kuwabara et al. | | 428/212 |
| 5,981,077 A | 11/1999 | Taniguchi | | 428/447 |
| 6,001,209 A | 12/1999 | Popat et al. | | 156/249 |
| 6,017,031 A | 1/2000 | Oosawa et al. | | 271/121 |
| 6,051,306 A | 4/2000 | Paulson | | 428/195 |
| 6,054,223 A | 4/2000 | Tsuchiya et al. | | 428/478.2 |
| 6,066,387 A | 5/2000 | Ueda et al. | | 428/212 |
| 6,071,368 A | 6/2000 | Boyd et al. | | 156/240 |
| 6,096,396 A | 8/2000 | Patton et al. | | 428/40.1 |
| 6,103,042 A | 8/2000 | Hatada et al. | | 156/235 |
| 6,108,020 A | 8/2000 | Oshima | | 347/214 |
| 6,136,129 A | 10/2000 | Petkovsek | | 456/247 |
| 6,152,038 A | 11/2000 | Wagner et al. | | 101/488 |
| 6,159,570 A | 12/2000 | Ulrich et al. | | 428/40.1 |
| 6,165,593 A * | 12/2000 | Brault et al. | | 428/32.12 |
| 6,174,404 B1 | 1/2001 | Klinger | | 156/272.2 |
| 6,241,332 B1 | 6/2001 | Cummins et al. | | 347/4 |
| 6,245,479 B1 | 6/2001 | Etzel | | 428/195 |
| 6,261,012 B1 | 7/2001 | Haas et al. | | 156/265 |
| 6,270,858 B1 | 8/2001 | Paulson | | 427/508 |
| 6,299,967 B1 | 10/2001 | Collins et al. | | 428/211 |
| 6,368,684 B1 | 4/2002 | Onishi et al. | | 428/29 |
| 6,392,680 B2 | 5/2002 | Akada et al. | | |
| 6,497,781 B1 | 12/2002 | Dalvey et al. | | 156/234 |
| 6,565,204 B2 | 5/2003 | Matsuhashi et al. | | 347/103 |
| 6,640,717 B2 | 11/2003 | Kosaka et al. | | 101/487 |

(56) References Cited

U.S. PATENT DOCUMENTS

| | | | |
|---|---|---|---|
| 6,644,802 B2 | 11/2003 | Minowa | 347/105 |
| 6,646,666 B2 | 11/2003 | Matsuoka | 347/213 |
| 6,737,139 B2 | 5/2004 | Sidney et al. | 428/43 |
| 6,857,736 B2 | 2/2005 | Onishi et al. | 347/105 |
| 6,866,382 B2 * | 3/2005 | Quintana et al. | 347/105 |
| 6,917,375 B2 | 7/2005 | Akada et al. | |
| 7,037,013 B2 | 5/2006 | Klinefelter et al. | 400/521 |
| 7,438,959 B2 | 10/2008 | Kometani et al. | |
| 2002/0012773 A1 | 1/2002 | Vaidya et al. | 428/195 |
| 2002/0018253 A1 | 2/2002 | Toshine et al. | 359/3 |
| 2002/0048654 A1 | 4/2002 | Yoshino et al. | 428/195 |
| 2002/0127042 A1 | 9/2002 | Klinefelter | 400/120.01 |
| 2003/0000637 A1 | 1/2003 | Campion et al. | 156/264 |
| 2003/0059565 A1 | 3/2003 | Otaki et al. | 428/40.1 |
| 2003/0072925 A1 * | 4/2003 | Kiyama et al. | 428/195 |
| 2003/0152753 A1 * | 8/2003 | Waller, Jr. | 428/195 |
| 2003/0213550 A1 | 11/2003 | Daems et al. | 156/250 |
| 2004/0125187 A1 | 7/2004 | Kosaka et al. | 347/102 |
| 2004/0135241 A1 | 7/2004 | Conner et al. | 257/679 |
| 2004/0146329 A1 | 7/2004 | Klinefelter | 400/120.01 |
| 2004/0161555 A1 | 8/2004 | Niu et al. | 428/32.1 |
| 2004/0224103 A1 * | 11/2004 | Karst et al. | 428/32.12 |
| 2006/0070545 A1 * | 4/2006 | Klinefelter et al. | 101/483 |

FOREIGN PATENT DOCUMENTS

| | | |
|---|---|---|
| EP | 3-234670 | 10/1991 |
| EP | 8-66999 | 3/1996 |
| EP | 1 013 466 A2 | 6/2000 |
| EP | 1013466 A2 * | 6/2000 |
| JP | 407314882 A | 5/1995 |
| JP | 09300675 A | 11/1997 |
| JP | 2870574 | 3/1999 |
| JP | 11 219116 A | 10/1999 |
| JP | 2002307874 A | 10/2002 |
| WO | WO 98/16394 | 4/1998 |
| WO | WO 98/24632 | 6/1998 |
| WO | WO 98/52762 | 11/1998 |
| WO | WO 99/04080 | 1/1999 |

OTHER PUBLICATIONS

Office Action dated Nov. 5, 2003 for U.S. Appl. No. 09/799,196.
U.S. Appl. No. 09/799,196 filed Mar. 5, 2001 entitled "Printer With Reverse Image Sheet".
Machine translation of 2002307874 to Hashiba et al. from Japanese Patent Office website.
Office Communication with Office action Summary for U.S. Appl. No. 10/757,823, filed Jan. 15, 2004 with a mailing date of Sep. 7, 2004.
Machine translation of JP 11034545 to Shindou et al. from Japanese Patent Office Website.
Office Communication for U.S. Appl. No. 10/865,521, filed Jun. 10, 2004; date of mailing: Feb. 22, 2005.
Notification of Transmittal of the International search report and the written opinion of the international searching authority, or the declaration from PCT/US04/00778.
Notification of Transmittal of the International search report and the written opinion of the international searching authority, or the declaration from PCT/US04/18537.
U.S. Appl. No. 60/478,490, filed Jun. 13, 2003.

\* cited by examiner

US 8,956,490 B1

IDENTIFICATION CARD SUBSTRATE SURFACE PROTECTION USING A LAMINATED COATING

CROSS-REFERENCE TO RELATED APPLICATION

The present application claims the benefit of U.S. provisional patent application Ser. No. 60/937,052, filed Jun. 25, 2007, which is incorporated herein by reference in its entirety.

BACKGROUND

Identification cards (e.g., drivers licenses, badges, etc.) are generally formed from rigid or semi-rigid card substrates (e.g., plastic, paper, etc.). Such identification cards generally include printed information (i.e., an image) on the substrate, such as a photo, identification numbers, identification information, account numbers, and other information. It is desirable to protect the surface of the identification card containing the printed information from abrasion, chemicals and other environmental conditions that may degrade the card surface and the printed information.

One method of protecting the card surface is to apply a very thin layer of edge-to-edge protection to the card surface using a thermal printhead and a panelized thermal print ribbon, which includes a clear overlay panel. Another method involves transferring a "thin film laminate" from a roll onto the surface of the substrate using a roll laminator. Unfortunately, these methods provide only minimal protection against abrasion and are generally not considered acceptable for long lived identification card applications.

Another method of protecting the card surface involves the application of a 0.5-1.0 mil polymeric patch laminate, typically formed of a polyester material, from a roll onto the card surface. In order to prevent the patch laminate from overhanging the edges of the card surface due to registration issues, the patch laminate is formed smaller than the card surface to which it is to be applied. As a result, the patch laminate cannot provide full edge-to-edge protection of the card surface.

U.S. Pat. No. 7,037,013, which is assigned to Fargo Electronics, Inc. of Eden Prairie, Minn., describes the transfer of a nominal 1.0 mil inkjet receptive coating from a liner onto a surface of a substrate using heat and pressure. The inkjet receptive coating that is in contact with the surface of the substrate is transferred to surface while the remainder of the coating remains attached to the liner. While the transferred inkjet coating covers the substrate from edge-to-edge and provides excellent abrasion resistance when dry, it is still susceptible to water born contaminants and shows less than adequate wet scratch resistance.

Embodiments of the present invention provide solutions to these and other problems, and offer other advantages over the prior art.

SUMMARY

Embodiments of the present invention are generally directed to methods of protecting a surface of an identification card, methods of forming an identification card and identification card manufacturing devices for performing the methods. In one embodiment of the method of forming an identification card, a card substrate having a surface is provided. A film laminate comprising a backing layer and one or more dried transferable layers attached to the backing layer is provided. One of the transferable layers comprises a coating comprising an inorganic ceramic-like material and a water insoluble polymer binder. The film laminate is laminated to the surface of the card substrate such that an exposed surface of the one or more transferable layers adheres to the surface of the cards substrate. The backing layer is then removed from at least a portion of the one or more transferable layers that remain adhered to the surface of the card substrate.

In one embodiment of the method of protecting a surface of an identification card, an identification card having a surface containing a printed image is provided. A film laminate comprising a backing layer and one or more dried transferable layers attached to the backing layer is provided. One of the transferable layers comprises a coating comprising an inorganic ceramic-like material and a water insoluble polymer binder. The film laminate is laminated to the surface of the card substrate such that an exposed surface of the one or more transferable layers adheres to the surface of the card substrate. The backing layer is then removed from at least a portion of the one or more transferable layers that remain adhered to the surface of the card substrate.

One embodiment of the identification card manufacturing device comprises a supply of card substrates, each substrate having a surface, a transport mechanism and a lamination section. The transport mechanism is configured to transport individual substrates along a processing path. The lamination section comprises a supply of film laminate and a laminating device. The supply of film laminate comprises a backing layer and one or more dried transferable layers attached to the backing layer. One of the transferable layers comprises a coating comprising an inorganic ceramic-like material and a water insoluble polymer binder. The laminating device is configured to laminate the film laminate to the surface of one of the card substrates such that an exposed surface of the one or more transferable layers adheres to the surface of the card substrate, and remove the backing layer from at least a portion of the one or more transferable layers that remain adhered to the surface of the card substrate.

Other features and benefits that characterize embodiments of the present invention will be apparent upon reading the following detailed description and review of the associated drawings.

DETAILED DESCRIPTION OF ILLUSTRATIVE EMBODIMENTS

Embodiments of the present invention are directed to methods and devices for protecting a surface of a card substrate and forming an identification card. The term "card substrate", as used herein, is a rigid or semi-rigid card (e.g., plastic) that is used to form identification cards. Paper sheets used in conventional sheet-feed paper printers and copiers are not "card substrates", as the term is used herein. The term "identification card", as used herein, includes driver's licenses, badges, name tags, personal identification cards, credit cards, passport pages and the like.

Embodiments of the method of protecting a surface of a card substrate will be described with reference to the flowchart of FIG. 1 and FIGS. 2-7. Note that the drawings are generally simplified illustrations and are not drawn to scale.

Figure 2:
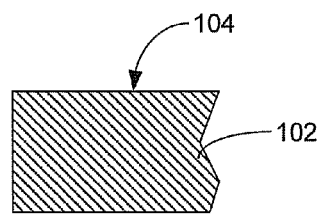
FIG. 2 is a simplified partial side cross-sectional view of a card substrate.

At step 100, a credential substrate 102 having a surface 104, shown in FIG. 2, is provided. As mentioned above, the substrate 102 can be a rigid or semi-rigid card formed of plastic, paper or other material commonly used to form identification cards. In one embodiment of step 100, the card substrate 102 is in the form of an identification card having a printed image (i.e., a photo, graphics, information, etc.) on the surface 104 or embedded therein.

Figure 3A:
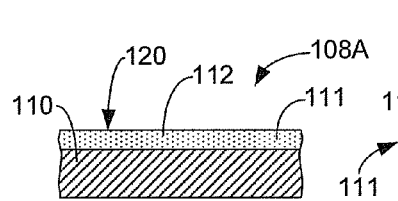
FIGS. 3A-C show simplified partial cross-sectional views of a film laminate in accordance with embodiments of the invention.
Figure 3B:
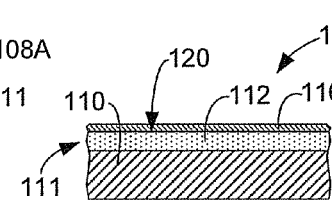
Figure 3C:
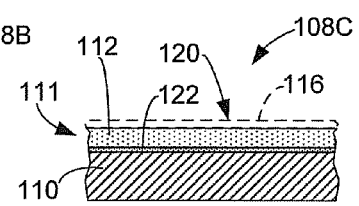

At step 106, a film laminate, generally referred to as 108, is provided. Embodiments of the film laminate 108 are illustrated in FIGS. 3A-C. In general, the film laminate 108 comprises a backing layer 110 and one or more transferable layers 111 attached to the backing layer 110 that can be laminated to the surface 104 of the card substrate 102.

Embodiments of the backing layer 110 include polymeric carrier films, coated paper and synthetic paper webs. The backing layer 110 can be a polyester resin, such as polyethylene terephthalate (PET) and polyester diacetate, a polycarbonate resin, a fluororesin such as ethylene tetrafluoroethylene (ETFE), and coated polyvinyl chloride resins, as well as coated paper and synthetic paper webs. Exemplary embodiments of the backing layer 110 have a thickness of 0.5 to 4 mils and are typically in the range of 0.5 to 2.0 mils.

Backing layer 110 may have a surface treatment (e.g., a prime or corona discharge treatment) to allow the one or more transferable layers 111 to be removably adhered, if necessary.

In one embodiment, the transferable layers 111 comprise a dried coating 112 to form the film laminate 108A, shown in FIG. 3A. Embodiments of the coating 112 generally comprise an inorganic ceramic-like material and a water insoluble polymer binder on the backing layer 110. In one embodiment, the coating 112 is substantially optically transparent.

Exemplary embodiments of the inorganic ceramic-like material include the boehmite form of alumina hydrate ($Al_2O_3 \cdot nH_2O$; n=1 to 1.5), a variety of silica or other ceramic-like materials. The polymer binder improves the abrasion and water resistance of the coating 112. Exemplary polymer binders include poly-vinyl chloride, poly-vinyl acetate, polyurethane, acrylic, or other chemistries. The coating 112 can also contain other components to provide desired properties. For instance, UV absorbers can be added to help prevent dye fading of a protected image. To improve coating stability, additional resin particles or surface tension modifiers may be added.

The coating 112 is generally formed by formulating the coating in a liquid state, applying the liquid coating on the backing layer 110, and drying the mixture to form the solid coating 112 and film laminate 108. In one embodiment, the coating 112 is formulated by mixing inorganic sols with polymeric dispersion resins or a variety of vinyl solution resins. For instance, the coating 112 can be formulated using alumina sols containing the ceramic-like material component. To the ceramic sol, dispersion resins and/or vinyl solution resins may be added at a 5-50% solids weight percent level, based on total solids. The dispersion resins may be comprised of the desired polymer binder. Other surface tension modifiers can be added to optimize the process of applying the coating 112 to the backing layer 110.

Once formulated, the liquid coating can be applied to the backing layer 110 via roll coating, air knife coating, slot fed knife coating, blade coating, rod coating, or a variety of other techniques. Once applied to the backing layer, the liquid coating is dried to form the film laminate 108. Embodiments of the final dried coating 112 include thicknesses in the range of 5-50 microns, and preferably in the range of 10-25 microns.

FIGS. 3B and 3C respectively illustrate film laminates 108B and 108C having transferable layers 111 in accordance with additional embodiments. The transferable layers 111 of the film laminate 108B comprise the dried coating 112 and one or more layers of material 116 on the dried coating 112. The one or more layers of material 116 are distinct from the coating 112. That is, the layer of material 116 that adjoins the coating 112 is different than the coating 112.

An adhesive layer (not shown) can be applied over the layer of material 116 to facilitate laminating the exposed surface 120 of the film laminate 108B to a card substrate 102, if necessary. The adhesive layer can comprise a thermal adhesive, such as ethylene vinyl acetate or vinyl/acrylic resins. The side of the backing layer 110 opposite the one or more transferable layers 111 can be treated with a low adhesion coating to prevent blocking when the film laminate 108 is wound up upon itself.

In one embodiment, the layer of material 116 comprises a print receptive material that facilitates printing an image on the coating 112. The print receptive material can be formulated in accordance with a desired print technology, such as dye sublimation printing (direct or thermal transfer), inkjet printing, solvent-based inkjet printing, electro-photography printing, or other print technology. For instance, the print receptive layer can comprise vinyl, vinyl-acetate copolymer, or other polymeric materials that are coated onto the surface 120 of the principal coating at a thickness of 0.25 to 2.0 microns, with the preferred range of 0.5 to 1.0 microns. A vinyl or vinyl acetate coating will be receptive to dye sublimation or thermal transfer printing and will adhere to a plastic card substrate 102 such as PVC.

In accordance with another embodiment, the layer of material 116 (FIG. 2B) comprises a thin film, such as an acrylic, polyester or other heat-formable material. In one embodiment, the thin film comprises a holographic image or security mark. After the coating 112 is transferred to the card substrate 102, the holographic thin film is protected by the coating 112.

One embodiment of the transferable layers 111 of the film laminate 108C comprises the dried coating 112 and a layer of material 122 between the dried coating 112 and the backing layer 110. The layer of material 122 is distinct (i.e., different) from the coating 112. In one embodiment, the layer of material 122 comprises a conventional thin film type of material, such as a coating of an acrylic material or a layer that is substantially polyvinyl chloride. The thin film type material is preferably coated having a dry thickness of 1.0 micron or less. The thin film layer of material can provide additional protection for the coating 112 and, thus, the substrate 102 to which the film laminate 108C is laminated. In yet another embodiment, the transferable layers 111 of the film laminate 108C include the coating 112, the layer of material 122 and the layer of material 116 (shown in phantom) described above, as shown in FIG. 3C.

Figure 4A:
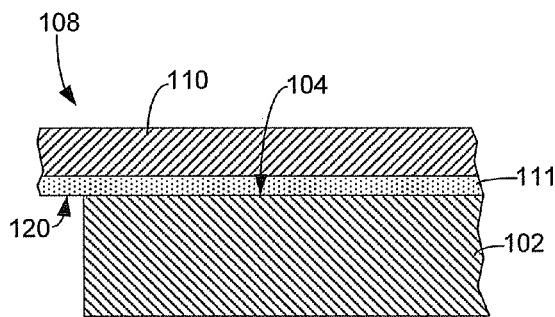
FIGS. 4A-B respectively show a partial side cross-sectional view and a top plan view of a film laminate laminated to a surface of a card substrate, in accordance with embodiments of the invention.
Figure 4B:
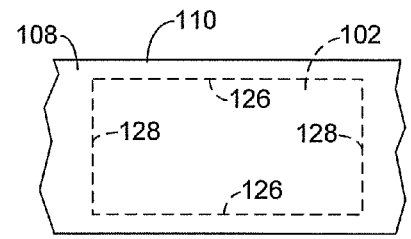

At step 124 of the method, the film laminate 108 is laminated to the surface 104 to bond the exposed surface 120 of the one or more transferable layers 111 of one of the film laminates 108A-C described above (hereinafter "film laminate 108") to the surface 104, as shown in FIG. 4A. The lamination step 124 generally involves placing the exposed surface 120 of the one or more transferable layers 111 in contact with the surface 104 of the substrate 102, such that the entire surface 104 of the card substrate 102 is covered by the one or more transferable layers 111. In one embodiment, the film laminate 108 is applied to the surface 104 of the substrate 102 such that the one or more of the transferable layers 111 extend beyond the lengthwise edges 126 and the widthwise edges 128 of the substrate 102, as illustrated in the simplified top plan view provided in FIG. 4B. This ensures full edge-to-edge coverage of the surface 104 by the film laminate 108.

In one embodiment, the film laminate 108 is heated and pressed against the surface 104 of the substrate 102 to bond the surface 120 of the one or more transferable layers 111 to the surface 104 during the laminating step 124. This process can be accomplished using a laminating device in the form of a heated laminating roller, separate heating and roller components, or other conventional laminating devices. Depending on the makeup of the coating 112, the temperatures used to transfer the coating 112 to the surface 104 may be in the range of 240-350 degrees Fahrenheit.

Figure 5:
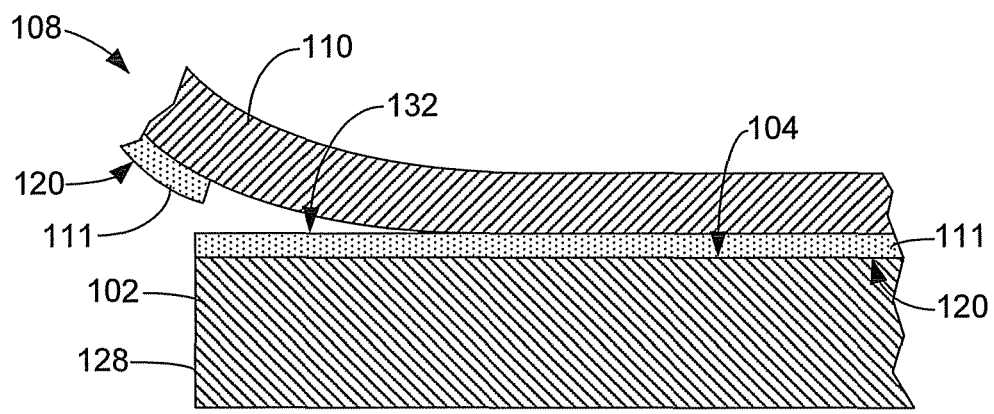
FIG. 5 is a simplified partial side cross-sectional view illustrating the removal of a backing layer of the film laminate from portions of one or more transferable layers that remain adhered to a surface of the card substrate, in accordance with embodiments of the invention.
Figure 6:
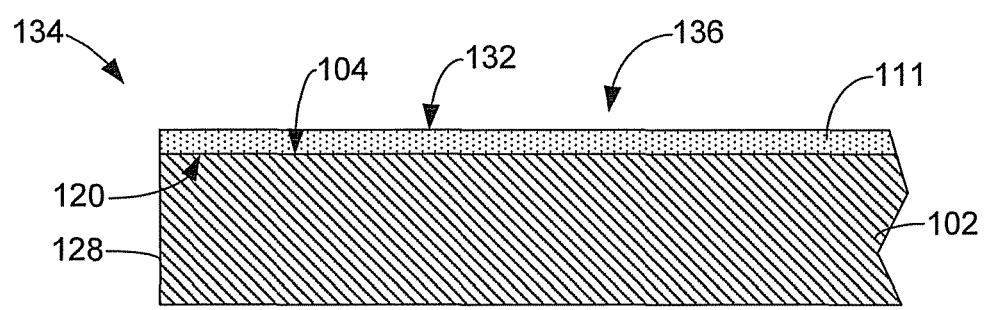
FIG. 6 is a partial side cross-sectional view of a laminated card substrate, in accordance with the embodiments of the invention.

At step 130, the backing layer 110 is removed from the surface 132 of the portion of the one or more transferable layers 111 that has been bonded to the surface 104 of the card substrate 102, as shown in the partial side-cross sectional view of FIG. 5, to form the laminated card substrate 134 shown in the partial side-cross sectional view of FIG. 6. In one embodiment, the one or more transferable layers 111 of the film laminate 108 that are bonded to the card substrate 102 extend over the entire surface 104. Thus, the one or more transferable layers 111 provide full edge-to-edge protection of the surface 104 of the substrate 102.

Figure 7:
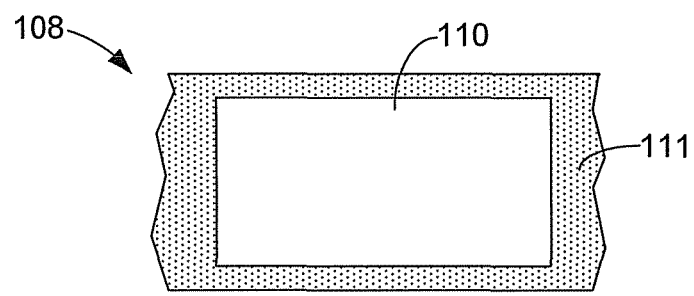
FIG. 7 is a bottom plan view of the film laminate following the removal of the backing layer from the one or more transferable layers that are bonded to the surface of the card substrate, in accordance with embodiments of the invention.

During the backing layer removal step 130, portions of the one or more transferable layers 111 of the film laminate 108 that are not bonded to the surface 104 of the substrate 102 fracture from the portions that are bonded to the surface 104 and remain attached to the backing layer 110, as shown in FIG. 5 and FIG. 7, which is a bottom plan view of the film laminate 108 after it is removed in step 130.

The coating 112 has an inherent characteristic of not adhering to identification card surfaces to which adhesion is not desired, such as, for example, the location of electrical contact pads (e.g., for smart card modules), magnetic stripes, signature panels and applied labels and patches, or other elements disposed on the surface 104 of the card substrate 102. As a result, portions of the one or more transferable layers 111 of the film laminate 108 that overlay these areas of the surface 104 may remain adhered to the backing layer 110 during the backing layer removal step 130. Accordingly, it is generally not necessary to apply a special non-stick coating to these surfaces prior to the lamination step 124.

The one or more transferable layers 111 operate as a protective layer to the surface 104 of the card substrate 102. In particular, the inorganic ceramic-like material of the coating 112 provides protection against abrasion while the water insoluble polymer binder substantially fills gaps between particles of the inorganic ceramic-like material to provide a substantially waterproof barrier for the surface 104. As a result, the coating 112 protects the surface 104 from abrasion including wet abrasion and blocks water from reaching the surface 104.

Another embodiment of the present invention is directed to a method of forming an identification card. This method is substantially identical to that described above, but with the additional step of printing at least one image (e.g., photo, graphics, text, etc.) that is visible when viewing a top side 136 (FIG. 6) of the laminated card substrate 134. The printing technique used to print the one or more images can be any conventional technique utilizing conventional printing devices, such as those described below.

Figure 1:
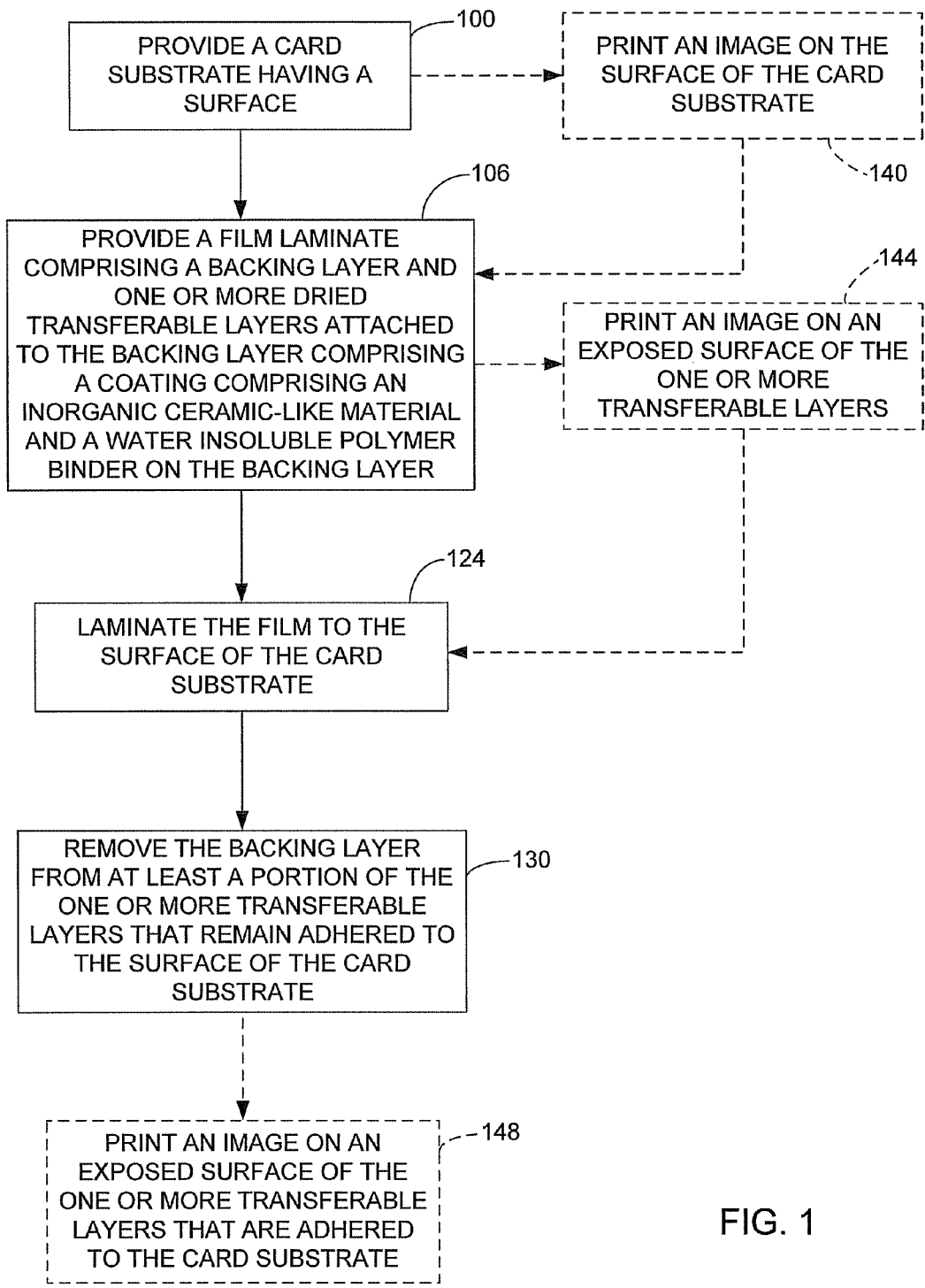
FIG. 1 is a flowchart illustrating a method of protecting a surface of an identification card substrate and a method of forming an identification card, in accordance with embodiments of the invention.

In one embodiment of the method, an image is printed on the surface 104 of card substrate 102, as indicated at step 140 in the flowchart of FIG. 1, prior to the lamination of the surface 104 in step 124. This results in an image 142 that is protected by the one or more transferable layers 111 following the lamination step 124, as shown in the partial side cross-sectional view of the laminated card substrate 134 provided in FIG. 8. Following the printing step 140, the method can return to step 106 and continue as discussed above.

Figure 8:
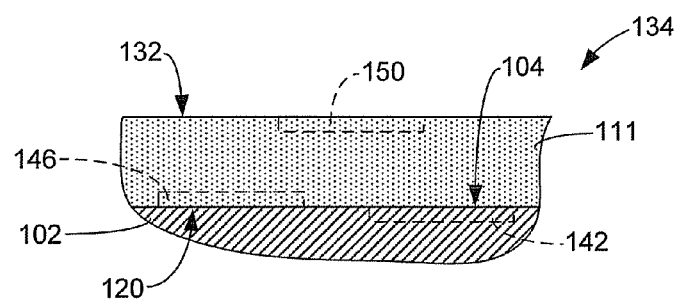
FIG. 8 is a partial side cross-sectional view illustrating the location of printed images, in accordance with embodiments of the invention.

In accordance with another embodiment of the method, an image is printed on the exposed surface 120 of the one or more transferable layers 111 of the film laminate 108 prior to the lamination of the surface 104 in step 124, as indicated at step 144. This results in an image 146 that is protected by the one or more transferable layers 111 following the lamination step 124, as shown in FIG. 8. Following the printing step 144, the method can move to the laminating step 124 and continue as discussed above.

In accordance with yet another embodiment of the method, an image is printed on the exposed surface 132 of the laminated card substrate 134, as indicated at step 148, following the removal of the backing layer 110 in step 130. This results in an image 150 on the laminated card substrate 134, as shown in FIG. 8. If desired, a protective layer can be applied over the surface 132 in accordance with the methods of the present invention or those described by the prior art to protect the image 150 following the printing step 148.

Figure 9:
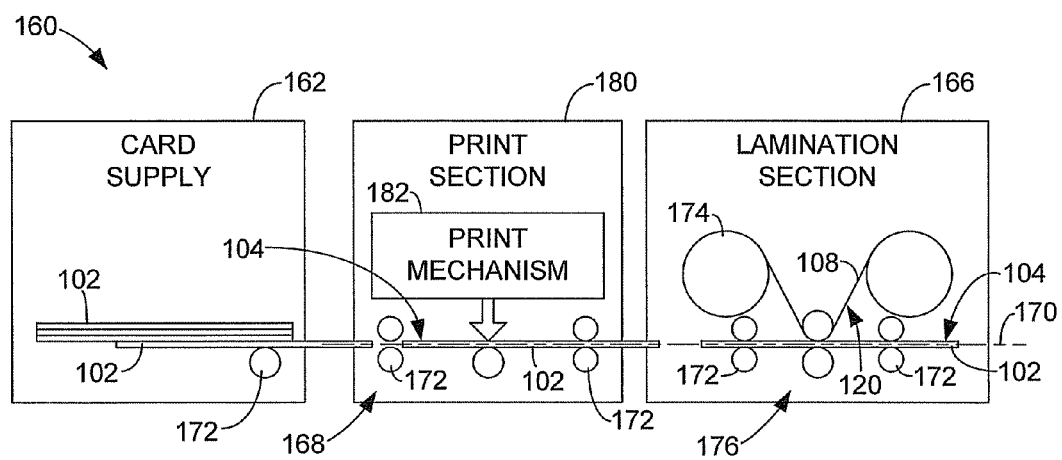
FIGS. 9-11 are simplified block diagrams of identification card manufacturing devices in accordance with embodiments of the invention.

Additional embodiments of the invention are directed to devices that are configured to perform the above-described methods. FIG. 9 is a simplified block diagram of an identification card manufacturing device 160 that is configured to perform the method of FIG. 1. The device 160 comprises a card supply 162 and a lamination section 166. The card supply 162 contains one or more card substrates 102, each of which has a surface 104 that is to be laminated in accordance with the present invention. A transport mechanism, generally referred to as 168, is configured to transport the individual card substrates 102 along a processing path 170. In one embodiment, the transport mechanism 168 comprises a plurality of motorized and idler rollers 172 that support and feed the card substrates 102 along the processing path 170.

The transport mechanism 168 feeds individual card substrates 102 from the card supply 162 along the processing path 170 to the lamination section 166. The lamination section 166 comprises a supply 174 of the film laminate 108 and a laminating device 176. The film laminate 108 can be in accordance with any one of the embodiments 108A-C described above. In general, the laminating device 176 is configured to perform steps 124 and 130 of the method shown in FIG. 1. Thus, the laminating device 176 is configured to heat the film laminate 108 and press the surface 120 of the film laminate 108 against the surface 104 of the substrate 102 to bond the surface 120 of the one or more transferable layers 111 to the surface 104. Embodiments of the laminating device 176 include a component configured to simultaneously heat the film laminate 108 and press the film laminate 108 against the surface 104, such as a heated laminating roller, separate heating and pressure-applying components, or other conventional laminating devices known to those skilled in the art. The laminating device is also configured to remove the backing layer 110 from the portions of the one or more transferable layers that are bonded to the substrate 102.

In one embodiment, the identification card manufacturing device 160 comprises a print section 180 that is generally configured to perform the printing step 140 of the method of FIG. 1. In one embodiment, the print section 180 comprises a print mechanism 182 that is configured to print an image to the surface 104 to the card substrate 102 that is delivered along the processing path 170 by the transport mechanism 168. The print mechanism 182 can include any suitable print mechanism known to those skilled in the art for printing to the surface of a card substrate 102. Exemplary print mechanisms 182 include reverse-image thermal transfer print mechanisms, dye sublimation print mechanisms, inkjet print mechanisms (water-based inks and solvent-based inks), electro-photographic print mechanisms, and other print mechanisms known to those skilled in the art.

In operation, a card substrate 102 is fed along the processing path 170 by the transport mechanism 168 to the print section 180. An image 142 (FIG. 8) is printed on the surface 104 of the card substrate 102 using the print mechanism 182 to complete step 140 of the method. The lamination section 166 includes the supply 174 of the film laminate 108 (step 106) and a laminating device 176 that laminates the film laminate 108 to the surface 104 (step 124) and removes the backing layer 110 from the portion of the one or more transferable layers 111 that remain adhered to the surface 104 (step 130) to form the laminated identification card 134 (FIG. 6).

Figure 10:
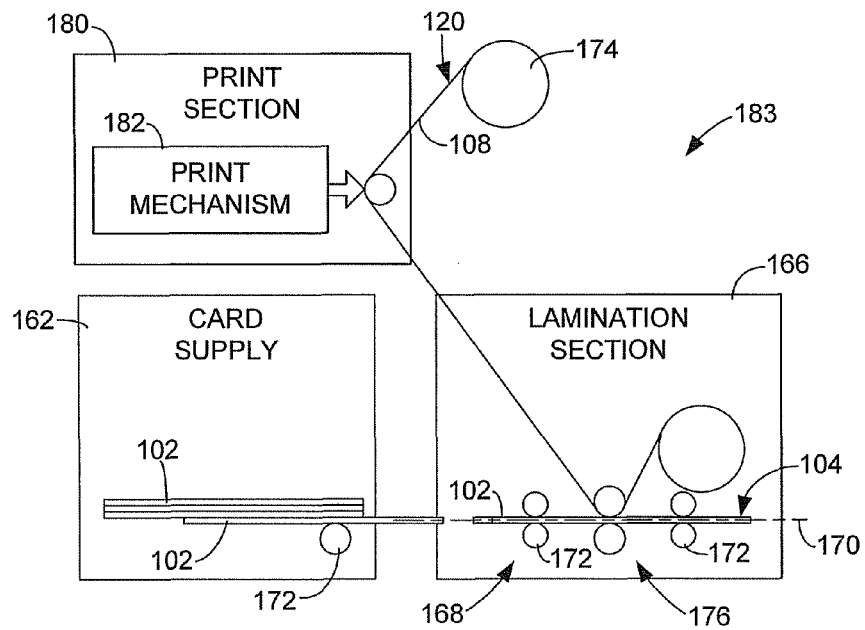

FIG. 10 is a simplified block diagram of an identification card manufacturing device 183 in accordance with embodiments of the invention. The device 183 is generally configured to perform the method of FIG. 1 including the optional printing step 144, in which an image 146 (FIG. 8) is printed to the surface 120 of the one or more transferable layers 111 of the film laminate 108. The identification card manufacturing device 183 comprises similar components to those of device 160 including the card supply 162, the print section 180 and the lamination section 166, although in a different configuration. In device 183, the film laminate 108 of the supply 174 is fed to the print mechanism 182, which is configured to print an image to the surface 120 of the one or more transferable layers 111 to perform the printing step 144 of the method of FIG. 1.

Individual card substrates 102 are fed from the card supply 162 of the device 183 along the processing path 170 by the transport mechanism 168 to the lamination section 166. The portion of the film laminate 108 containing the printed image is aligned with the surface 104 of the card substrate 102 and presented to the laminating device 176, which performs the laminating step 124 and the backing layer removal step 130 of the method. This results in the production of an identification card that includes the image 146, which is protected by the one or more transferable layers 111, as illustrated in FIG. 8.

Figure 11:
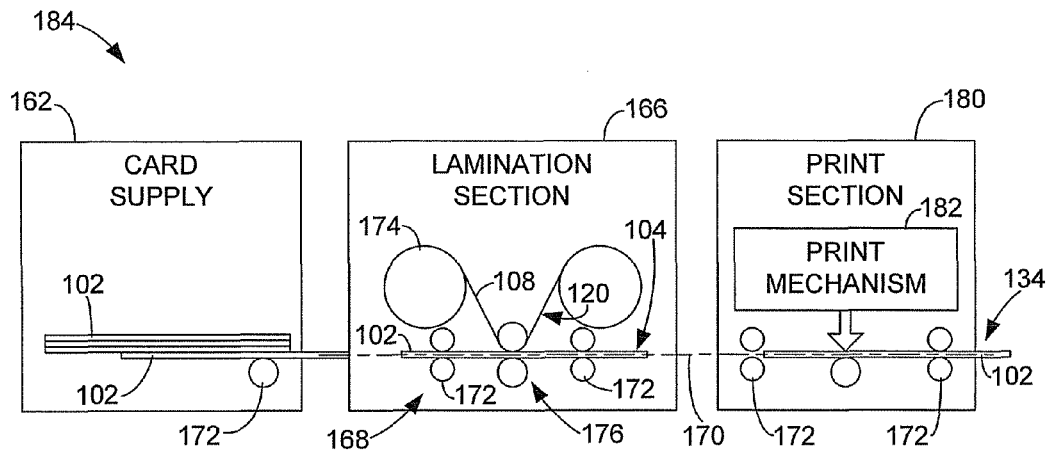

FIG. 11 is a simplified block diagram of an identification card manufacturing device 184, in accordance with embodiments of the invention. The device 184 generally includes the components described above with regard to devices 160 and 183 including the card supply 162, the lamination section 166 and the print section 180, although in a slightly different configuration. The device 184 is generally configured to perform the method of FIG. 1 including the optional printing step 148. Individual card substrates 102 are fed from the card supply 162 along the processing path 170 by the transport mechanism 168 to the lamination section 166. The laminating device 176 laminates the film laminate 108 of the supply 174 to the surface 104 of the card substrate 102 (step 124) and removes the backing layer 110 from the portion of the transferable layers 111 that are bonded to the surface 104 (step 130) to form the laminated card substrate 134 (FIG. 6). The laminated card substrate 134 is then fed to the print section 180 by the transport mechanism 168 where the print mechanism 182 prints an image 150 (FIG. 8) to the surface 132 of the one or more transferable layers 111 to complete step 148 and form the identification card.

Additional embodiments of the identification card manufacturing device of the present invention includes a combination of one or more of the configurations provided above. That is, embodiments of the identification card manufacturing device of the present invention include one or more print sections 180 to facilitate the printing of at least two of the images 142, 146 and 150, shown in FIG. 8, and a lamination section 166 configured to laminate the one or more transferable layers 111 of the film laminate 108 to the surface 104 of a card substrate 102.

Although the present invention has been described with reference to preferred embodiments, workers skilled in the art will recognize that changes may be made in form and detail without departing from the spirit and scope of the invention. For example, it should be understood that the present invention includes the embodiments described above taken individually and in combination with one or more of the other embodiments of the invention.

What is claimed is:

1. A method of forming an identification card comprising:
   providing a card substrate having a surface;
   providing a film laminate comprising a backing layer and one or more dried transferable layers attached to the backing layer, one of the transferable layers comprising a coating comprising:
      an inorganic ceramic-like material; and
      a water insoluble polymer binder comprising a component selected from the group consisting of poly-vinyl chloride, poly-vinyl acetate, polyurethane and acrylic;
   laminating the film laminate to the surface of the card substrate such that an exposed surface of the one or more transferable layers adheres to the surface of the card substrate; and
   removing the backing layer from at least a portion of the one or more transferable layers that remain adhered to the surface of the card substrate;
   wherein:
      the transferrable layers include non-transfer portions that do not overlay the surface of the card substrate during laminating the film laminate to the surface of the card substrate;
      the non-transfer portions of the transferrable layers remain attached to the backing layer during removing the backing layer; and
      the transferable layer comprising the coating forms a waterproof barrier for the surface of the card substrate.

2. The method of claim 1, further comprising printing an image on the surface of the card substrate prior to laminating the film laminate to the surface.

3. The method of claim 1, further comprising printing an image on the exposed surface of the one or more transferable layers prior to laminating the film to the surface of the card substrate.

4. The method of claim 1, further comprising printing an image on the one or more transferable layers following removing the backing layer from at least a portion of the one or more transferable layers.

5. The method of claim 1, wherein the coating has a thickness that is less than 50 microns.

6. The method of claim 1, wherein the one or more transferable layers comprise a print receptive layer of material overlaying a surface of the coating that is opposite that of the backing layer.

7. The method of claim 1, wherein the one or more transferable layers comprise a thin film having an image printed thereon, the thin film overlaying a surface of the coating that is opposite that of the backing layer.

8. The method of claim 1, wherein the one or more transferable layers comprise a thin film between the coating and the backing layer.

9. A method of protecting a surface of an identification card comprising:
providing an identification card having surface containing a printed image;
providing a film laminate comprising a backing layer and one or more dried transferable layers attached to the backing layer, one of the transferable layers comprising a coating comprising:
an inorganic ceramic-like material; and
a water insoluble polymer binder comprising a component selected from the group consisting of poly-vinyl chloride, poly-vinyl acetate, polyurethane and acrylic;
laminating the film laminate to the surface of the card substrate such that an exposed surface of the one or more transferable layers adheres to the surface of the card substrate; and
removing the backing layer from at least a portion of the one or more transferable layers that remain adhered to the surface of the card substrate;
wherein:
the transferrable layers include non-transfer portions that do not overlay the surface of the card substrate during laminating the film laminate to the surface of the card substrate;
the non-transfer portions of the transferrable layers remain attached to the backing layer during removing the backing layer; and
the transferable layer comprising the coating forms a waterproof barrier for the surface of the card substrate.

10. The method of claim 9, wherein the coating has a thickness that is less than 50 microns.

11. The method of claim 9, wherein the one or more transferable layers comprise a print receptive layer of material overlaying a surface of the coating that is opposite that of the backing layer.

12. The method of claim 9, wherein the one or more transferable layers comprise a thin film having an image printed thereon, the thin film overlaying a surface of the coating that is opposite that of the backing layer.

13. The method of claim 9, wherein the one or more transferable layers comprise a thin film between the coating and the backing layer.

14. A method comprising:
forming a film laminate comprising:
providing a backing layer;
preparing a coating comprising:
providing an inorganic ceramic-like material; and
binding the inorganic ceramic-like material using a water insoluble polymer binder comprising a component selected from the group consisting of poly-vinyl chloride, poly-vinyl acetate, polyurethane and acrylic; and
forming one or more transferable layers on the backing layer comprising applying the coating to the backing layer and drying the applied coating.

15. The method of claim 14, further comprising:
providing a card substrate having a surface;
laminating the film laminate to the surface of the card substrate such that an exposed surface of the one or more transferable layers adheres to the surface of the card substrate; and
removing the backing layer from at least a portion of the one or more transferable layers that remain adhered to the surface of the card substrate;
wherein the transferable layer comprising the coating forms a waterproof barrier for the surface of the card substrate.

16. The method of claim 15, further comprising printing an image on the surface of the card substrate prior to laminating the film laminate to the surface.

17. The method of claim 15, wherein forming one or more transferable layers on the backing layer comprises forming a print receptive layer of material overlaying a surface of the coating that is opposite that of the backing layer.

18. The method of claim 17, further comprising printing an image on the print receptive layer prior to laminating the film to the surface of the card substrate.

19. The method of claim 15, wherein:
the transferrable layers include non-transfer portions that do not overlay the surface of the card substrate during laminating the film laminate to the surface of the card substrate; and
the non-transfer portions of the transferrable layers remain attached to the backing layer during removing the backing layer.

* * * * *